United States Patent [19]

Lee

[11] 4,024,185

[45] May 17, 1977

[54] CYCLOALIPHATIC UNSYMMETRICAL DIAMINES

[75] Inventor: Lester T. C. Lee, Parsippany, N.J.

[73] Assignee: Allied Chemical Corporation, Morris Township, N.J.

[22] Filed: Dec. 4, 1974

[21] Appl. No.: 529,438

Related U.S. Application Data

[60] Continuation-in-part of Ser. No. 394,606, Sept. 5, 1973, abandoned, which is a division of Ser. No. 143,186, May 13, 1971, Pat. No. 3,776,890.

[52] U.S. Cl. .................. 260/563 R; 260/563 C; 260/78 R
[51] Int. Cl.² .......................... C07C 87/38
[58] Field of Search ....... 260/563 B, 563 C, 563 D, 260/563 R, 78 R

[56] References Cited

UNITED STATES PATENTS

| | | | |
|---|---|---|---|
| 2,461,495 | 2/1949 | Floyd | 260/78 R |
| 2,512,606 | 6/1950 | Bolton et al. | 260/78 R |
| 2,606,928 | 8/1952 | Barkdoll et al. | 260/563 B |
| 3,117,992 | 1/1964 | Duggan | 260/563 B UX |
| 3,697,594 | 10/1972 | Knowles | 260/563 C |

FOREIGN PATENTS OR APPLICATIONS 681,688  10/1952  United Kingdom ........... 260/563 R

OTHER PUBLICATIONS

Hass et al. J.A.C.S. vol. 71, pp. 2290–2291 (1949).

*Primary Examiner*—Allen B. Curtis
*Attorney, Agent, or Firm*—Arthur J. Plantamura; Roger H. Criss

[57] ABSTRACT

Novel cycloaliphatic diamines have been prepared which are consisting of two unequivalent amine groups. The diamines are prepared by reduction of aromatic dinitro compounds. The polyamides made from these diamines are useful in forming fibers and films having excellent high temperature properties.

5 Claims, No Drawings

CYCLOALIPHATIC UNSYMMETRICAL DIAMINES

This application is a continuation-in-part of application Ser. No. 394,606, filed Sept. 5, 1973, now abandoned, which in turn is a divisional application of Ser. No. 143,186, filed on May 13, 1971, now U.S. Pat. No. 3,776,890.

The invention provides novel unsymmetrical cycloaliphatic diamines having the formula

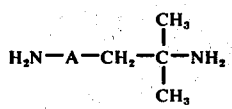

wherein A is a cycloaliphatic moiety having 6 to 15 carbon atoms, such as trans-1,4 cyclohexyl, cis-1,4-cyclohexyl, bis(p-cyclohexyl)methylene and bis(p-cyclohexyl)isopropylene.

The diamine wherein A is p-cyclohexylene (2-(4-aminocyclohexyl)-1,1-dimethylethylamine) is prepared from 2-(4-aminophenyl)-1,1-dimethylethylamine in accordance with conventional methods for converting aromatic diamines to the corresponding saturated diamines. A typical method of preparation comprises reacting 2-(4-aminophenyl)-1,1-dimethylethylamine in an inert solvent, such as dioxane, with hydrogen at a pressure of from about 800 to 1500 p.s.i.g. in the presence of a conventional hydrogenation catalyst, such as ruthenium supported on carbon. The reaction is normally carried out at a temperature of from about 100° to 150° C. Of course, 2-(4-aminocyclohexyl)-1,1-dimethylethylamine can be prepared directly from 2-(4-nitrophenyl)-1,1-dimethyl-1-nitroethane in accordance with this method, although 2-(4-aminophenyl)-1,1-dimethylethylamine would be formed as an intermediate.

Polyamides are prepared from the novel diamines of this invention by polymerization with a diacyl halide having the formula

wherein R is a divalent organic radical and X represents a halogen, preferably chlorine or bromine, more preferably chlorine. The polymerization is conveniently carried out in accordance with conventional interfacial or solution polymerization techniques. For example, in a typical polymerization, a solution of the diacyl halide in an inert organic solvent is added to a vigorously stirred solution of the diamine in water or an inert organic solvent. The polymerization reaction proceeds rapidly at room temperature, but temperatures above or below room temperature can be used if desired. The resultant polyamide is recovered from the reaction mixture in accordance with conventional methods, such as by filtration.

Polyamides can also be prepared from these cycloaliphatic diamines in accordance with conventional melt polymerization techniques by first forming the salt of the amine and a dicarboxylic acid having the formula HOOCRCOOH wherein R is as defined herein, and then polymerizing the salt at an elevated temperature, such as between about 225° and 350° C., until a polymer of film-forming molecular weight is obtained. The salt is readily formed by combining a substantially 1:1 molar ratio of the diamine and the diacid in an inert solvent, such as absolute ethyl alcohol.

In the dicarboxylic acids and derivatives thereof employed in this invention, the oganic diradical designated "R" is preferably an aliphatic, aromatic, or aliphatic-aromatic diradical or substituted derivative of such diradicals. Suitable aliphatic diradicals include straight chain alkyl diradicals, branched chain alkyl diradicals and cycloalkyl diradicals. The aliphatic chain can contain hetero atoms, such as sulfur or oxygen, and can also bear substituents, such as halogen atoms, which are nonreactive under the conditions of polymerization. Suitable aromatic diradicals include phenylene, a fused aromatic group, such as naphthylene, or two or more linked aromatic nuclei, such as represented by biphenylene, bisphenylenemethane, bisphenylenepropane, bisphenylenesulphone, bisphenylene ether, and the like. In addition, any of the aromatic groups may bear one or more nuclear substituents, such as lower alkyl groups or halogen atoms, which are non-reactive under the conditions of polymerization. The diradical preferably contains from 2 to 18 carbon atoms, more preferably 2 to 12 carbon atoms. Particularly suitable dicarboxylic acids and derivatives thereof include those wherein R is phenylene or has the formula —(CH$_2$)$_m$— wherein $m$ is an integer from 2 to 12.

Mixtures of dicarboxylic acids or derivatives thereof can also be used in this invention to produce polymers having recurring units wherein the group represented by R in the general formula for the polymers refers to two or more different diradicals.

Thus, the novel polyamides of this invention have recurring units of the formula

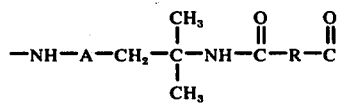

wherein A and R are as defined herein.

The polyamides of this invention are characterized by having excellent high temperature properties. In particular, the polyamides have high glass transition temperatures and yet are melt processable. In general, a high glass transition temperature is desirable in that it reflects the resistance of the polymer to deformation at temperatures up to the glass transition temperature. For example, fibers of a polymer having a high glass transition temperature have greater resiliency and resistance to wrinkling. A notable feature of the polyamides of this invention is their high glass transition temmperatures coupled with their comparatively low melting points. A low melting point is desirable for ease in melt processing. Hence, a high ratio of glass transition temperature to melting point, $T_g/T_m$ (the temperatures being expressed in degree Kelvin), is especially desirable. The polyamides are characterized by having exceptionally high $T_g/T_m$ ratios. The ratios are normally above 0.74.

The high $T_g/T_m$ ratios of the polymers represent a surprising phenomenon. To explain this phenonmenon, it is theorized that the high ratios are due to the presence of the gem dimethyl groups in the diamine moiety. This theory is supported by the fact that the polymer wherein A is R is n-butylene has a $T_g/T_m$ ratio of 0.75 whereas the corresponding polymer having hydrogen in place of the gem-dimethyl groups has a $T_g/T_m$ ratio of only 0.66 ($T_g$=115° C., $T_m$=312° C.). Accordingly, similar diamines having gem-dimethyl groups would also be expected to produce polymers having high $T_g/T_m$ ratios.

This invention also demonstrates the important effect of the trans and cis isomer ratio of the unsymmetric diamines on the properties of the polyamides resulted. In the case of 2-(4-amino-cyclohexyl)-1,1-dimethylethylamine, both the trans isomer A and cis isomer B are reacted with the same diacid to form the polyamides.

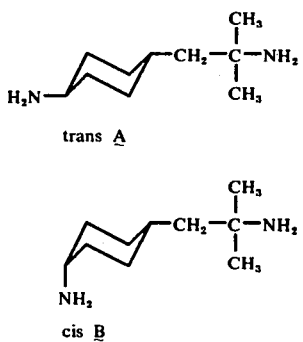

trans A cis B

It was found that the higher the trans isomer in the polymer, the higher the $T_g$, $T_m$ and crystallinity.

This invention is further illustrated by the following examples. The products in the examples were identified in accordance with conventional modern analytical techniques.

EXAMPLE 1

Preparation of 2-(4-Aminophenyl)-1,1-Dimethylethylamine

Ten grams of 2-(4-nitrophenyl)-1,1-dimethyl-1-nitroethane, prepared from the reaction of p-nitrobenzyl chloride and 2-nitropropane catalyzed by lithium hydride, dissolved in dioxane, was hydrogenated in the presence of 0.8 grams of 10% ruthenium on carbon at 120° C. and 1600 p.s.i.g. for 7 hours. The reaction mixture was filtered and the filtrate was fractionally distilled to produce 6.7 grams of trans 2-(4-aminocyclohexyl)-1,1-dimethylethylamine (A) boiling point 78° C. at 0.2 mm Hg, and 1.5 grams of cis 2-(4-aminocyclohexyl)-1,1-dimethylethylamine (B), boiling point 69° C. at 0.2 mm Hg.

EXAMPLE 2

Preparation of 1-[4-aminocyclohexyl]-2-[4-(2-amino-2-Methylpropyl)Cyclohexyl]Methane Five grams of 1-[4-nitrophenyl]-1-[4-(2-nitro-2-methylpropyl)]methane, prepared from the condensation of nitrobenzene and 1,1-dimethyl-1-nitro-2-phenylethane with formaldehyde, dissolved in 40 ml of dioxane, was hydrogenated in the presence of 0.5 gram of 10% ruthenium on carbon at 140° C. and 1500 p.s.i.g. for 4 hours. The reaction mixture was filtered and fractionally distilled to produce 3.2 grams of the product (boiling point 85° C. at 0.4 mm Hg.)

EXAMPLE 3

Preparation of 2[4-aminocyclohexyl]-2-[4-(2-amino-2-methylpropyl)Cyclohexyl]Propane Four grams of 2[4-nitrophenyl]-2-[4-(2-nitro-2-methylpropyl)phenyl]propane, prepared from the condensation reaction of nitrobenzene and 1,1-dimethyl-1-nitro-2-phenylethane with acetone, dissolved in 50 ml of dioxane, was hydrogenated at 150° C. and 1400 p.s.i.g. for 5 hours in the presence of 0.55 gram of 10% ruthenium on carbon. The reaction mixture was filtered, and the filtrate was fractionally distilled to produce 2.9 grams of 2[4-aminocyclohexyl]-2-[4-(2-amino-2-methylpropyl)cyclohexyl]propane (boiling point 98° C. at 0.55 mm Hg).

EXAMPLE 4

Preparation of Polyamide From 4-Trans-2-(4-Aminocyclohexyl)-1,1-Dimethylamine and Adipyl Chloride by Interfacial Method A polyamide was prepared from 100% trans 2-(4-aminocyclohexyl)-1,1-dimethylamine by polymerization with adipyl chloride in accordance with the interfacial polymerization technique.

The polyamides were prepared in accordance with the following typical method. A solution of 2.96 grams of adipyl chloride in 60 ml. of 1,2-dichloroethane was added to a vigorously stirred solution of 2.76 grams of 2-(4-aminocyclohexyl)-1,1-dimethylethylamine. A polymer formed immediately and after 5 minutes the reaction mixture was poured into ice water. The polymer, which was recovered by filtration, washed and dried, weighed 4.7 grams (85% yield). The properties of the polyamide are tabulated below:

| | |
|---|---|
| $T_g$, ° C. | 92 |
| $T_m$, ° C. | 209 |
| $T_g/T_m$ | 76 |
| Reduced viscosity | 0.19 |
| Crystallinity, percent | 33 |

EXAMPLE 5

Preparation of Polyamide from Trans-2-(4-aminocyclohexyl)-1,1-Dimethylethylamine and Adipic Acid by Salt Method A polyamide was prepared from 2-(4-aminocyclohexyl)-1,1-dimethylethylamine by polymerization with adipic acid in accordance with the salt polymerization technique as follows A solution of 4 grams of 2-(4-aminocyclohexyl)-1,1-dimethylethylamine in 20 ml. of absolute ethanol is added to the 3.4 grams adipic acid in 50 ml. of absolute ethanol and salt was forming. After standing overnight, the salt is filtered, yield is 6.95 grams or 94% yield. The salt melts at 190° C.

The salt was charged into glass ampules which are then sealed under vacuum. The ampules were heated at 220° C. for two hours and 240° C. for 1½ hours. The properties of the polyamides are tabulated below:

| | |
|---|---|
| $T_g$, ° C. | 95 |
| $T_m$, ° C. | 210 |
| $T_g/T_m$ | 0.76 |
| Reduced viscosity | 0.55 |

| crystallinity | >33 |

EXAMPLE 6

Preparation of Polyamide from 80% Trans - 20% Cis 2(4-aminocyclohexyl)-1,1-Dimethylethylamine and Adipic Acid A polyamide was prepared from a mixture of salt consisting of 80% trans and 20% cis of 2(4-aminocyclohexyl)-1,1-dimethylethylamine and adipic acid in accordance with the procedure shown in Example 5. The properties of the polyamides are tabulated below:

| $T_g$, ° C. | 79 |
| $T_m$, ° C. | 200 |
| $T_g/T_m$ | 0.76 |
| Reduced viscosity | 0.42 |
| Crystallinity | 15 |

EXAMPLE 7

Preparation of Polyamide from Trans 2-(4-aminocyclohexyl)-1,1-Dimethylethylamine and Terephthyl Chloride A polyamide was prepared from trans 2-(4-aminocyclohexyl)-1,1-dimethylethylamine by polymerization with terephthyl chloride in accordance with the interfacial polymerization technique employed in Example 4. The properties of the polyamide are tabulated below:

| $T_g$, ° C. | 135 |
| $T_m$, ° C. | 275 |
| $T_g/T_m$ | 0.75 |
| Reduced viscosity | 0.30 |

EXAMPLE 8

Preparation of Polyamide from 2-[4-aminocyclohexyl]-2-[4-(2-amino-2-methyl-propyl)cyclohexyl]Propane A polyamide was prepared from 2-[4-aminocyclohexyl]-2-[4-(2-amino-2-methylpropyl)cyclohexyl]-propane by polymerization with adipyl chloride in accordance with the interfacial technique employed in Example 4. The properties of the polyamide are tabulated below:

| $T_g$, ° C. | 120 |
| $T_m$, ° C. | 245 |
| $T_g/T_m$ | 0.76 |
| Reduced viscosity | 0.28 |

I claim:

1. A compound having the formula:

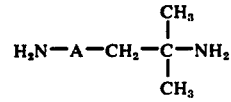

which comprises substantially trans-isomer and wherein A is p-cycloaliphatic radical having 6 to 15 carbon atoms.

2. The compound of claim 1 wherein the compound is trans-2-(4-aminocyclohexyl)-1,1-dimethylethylamine.

3. The compound of claim 1 wherein the compound is cis-2-(4-aminocyclohexyl)-1,1-dimethylethylamine.

4. The compound of claim 1 wherein the compound is 1-[4-aminocyclohexyl]-1-[4-(2-amino-2-methyl-propyl)cyclohexyl]methane.

5. The compound of claim 1 wherein the compound is 2-[4-aminocyclohexyl]-2-[4-(2-amino-2-methyl-propyl)cyclohexyl]propane.

* * * * *